United States Patent [19]
Fujiwara et al.

[11] Patent Number: 5,599,246
[45] Date of Patent: Feb. 4, 1997

[54] TOOTHED BELT

[75] Inventors: Toru Fujiwara, Tokorozawa; Yoshinori Itoh, Hanno; Masato Tomobuchi, Sakado, all of Japan

[73] Assignee: Tsubakimoto Chain Co., Osaka-fu, Japan

[21] Appl. No.: 404,829

[22] Filed: Mar. 15, 1995

[30] Foreign Application Priority Data

Mar. 16, 1994 [JP] Japan .................................. 6-070185

[51] Int. Cl.⁶ ...................................... F16G 1/28
[52] U.S. Cl. ...................... 474/205; 474/266; 474/271
[58] Field of Search ............................... 474/271, 205, 474/266, 273, 204

[56] References Cited

U.S. PATENT DOCUMENTS

| | | | |
|---|---|---|---|
| 5,157,083 | 10/1992 | Aonuma et al. | 525/285 |
| 5,234,387 | 8/1993 | Fujiwara et al. | 474/205 |
| 5,342,252 | 8/1994 | Fujiwara et al. | 474/266 |
| 5,458,544 | 10/1995 | Fujiwara et al. | 474/205 |
| 5,484,341 | 1/1996 | Fujiwara et al. | 474/205 |

FOREIGN PATENT DOCUMENTS

1-269743  10/1989  Japan .

*Primary Examiner*—Roger J. Schoeppel
*Attorney, Agent, or Firm*—Armstrong, Westerman, Hattori, McLeland & Naughton

[57] ABSTRACT

A toothed belt includes a rubber composition-molded cured material, a tensile body embedded therewithin, and a tooth sheet. The rubber composition-molded cured material includes 0.38 to 0.91 g of organic peroxide, based on —O—O-linkage amount, to 100 g of a polymer composition in which zinc polymethacrylate and hydrogenated nitrile rubber with hydrogenation rate of 90 to 95% are compounded in the weight ratio of from 4:96 to 20:80, 0.5 to 2.0 g of more than one higher organic acid esters, 0.5 to 2.0 g of maleimide compound, and 20 to 40 g of calcium carbonate.

2 Claims, 1 Drawing Sheet

FIG. 1

TOOTHED BELT

BACKGROUND OF THE INVENTION

The present invention relates to a toothed belt for a power transmission device, and more particularly pertains to a new and improved toothed belt for driving a cam shaft of an automobile engine.

Conventionally, a toothed belt for driving a cam shaft of an automobile engine (hereinafter referred to as "toothed belt") comprises a rubber body made of a raw material of rubber, which is mainly composed of chloroprene. Recently, as automobiles have oriented high-class and high-efficiency, automobile engines are required to be high-powered. As a result, the conventional toothed belt, a rubber body of which is made mainly of chloroprene, lacks thermal and high-load resistance, because the ambient temperature rises in the place where the toothed belt is used, and also a cam shaft drive is highly loaded. On the other hand, other toothed belts have been developed in which the rubber bodies are made mainly of such materials as chlorosulfuric polyethylene or sulfur-crosslinked, hydrogenated nitrile. These belts, however, do not yet provide the desirable thermal and high-load resistance, because the high-power of an automobile engine has advanced beyond the advances in these toothed belts.

Further, it has hitherto been known as described in, for example, Japanese Patent Application Laid-open Nos. Hei 1-269743 or 5-164194, to provide a toothed belt including a rubber body which uses a carboxyl-terminated polybutadiene containing a peroxide crosslinking-based hydrogenated nitrile rubber composition as a co-crosslinking agent.

The actual situation with today's change of life-style, however, is that the owners of automobiles usually do not perform daily inspections thereof, and those owners cannot be expected to take preventive measures against the breakdown of their own automobiles. Under the circumstances, improvement has been requested in the efficiencies of the parts for the automobiles or in maintenance-free parts, not excepting the toothed belt. Although various attempts have been made with respect to the improvement of the toothed belt, the actual situation is that a life span of the toothed belt by itself has not been so prolonged as that of the automobile as a whole.

Various attempts have been made to provide a rubber composition adapted to a tooth rubber or back rubber of the toothed belt. Japanese Patent Application Laid-open No. Sho 63-270753 describes a technology utilizing a metal salt of organic peroxide and carboxylic acid as a crosslinking agent, thereby improving intensity characteristics of polymer. Japanese Patent Application Laid-open No. Hei 1-146935 describes a technology improving a modulus of a rubber by adding unsaturated carboxylate to ethylenic unsaturated nitrile conjugated diene-based highly saturated polymer rubber.

However, when repeated compressive deformation is applied to the toothed belt, which has been cured and formed by using the foregoing rubber composition, not only generation of heat but also compressive permanent strain grows, and the gears do not engage smoothly with a sprocket, so that a noise or a breakdown, such as tooth breakage, may occur. Further, when the latter rubber composition is used, the toothed belt becomes easily cut due to an insufficient bending fatigue limit thereof.

SUMMARY OF THE INVENTION

The present invention solves the above problems. Thus, it is the object of the present invention to provide a toothed belt which gives high-performance and prolonged longevity thereof.

To attain the above-mentioned objects, a toothed belt according to one preferred mode of the present invention comprises a rubber composition-molded cured material, a tensile body embedded therewithin, and a tooth sheet, wherein the rubber composition-molded cured material is formed and cured from a rubber composition which includes 0.38–0.91 g of organic peroxide, based on —O—O-linkage amount, to 100 g of polymer composition in which zinc polymethacrylate and hydrogenated nitrile rubber with hydrogenation rate of 90–95% are compounded in the weight ratio of from 4:96 to 20:80, 0.5–2.0 g of more than one variety of higher organic acid ester, 0.5–2.0 g of maleimide compound, and 20–40 g of calcium carbonate.

It is preferable that the foregoing polymer composition of the rubber composition includes (i) polymer complex wherein zinc polymethacrylate and hydrogenated nitrile rubber with hydrogenation rate of 90–95% are polymerized in the compounding weight ratio of from 40:60 to 50:50, and (ii) hydrogenated nitrile rubber with hydrogenation rate of 90–95%, wherein the polymer complex and the hydrogenated nitrile rubber are compounded in the weight ratio of from 10:90 to 40:60 and no more than 10 g of carbon is included therein as a filler.

DETAILED DESCRIPTION OF THE PREFERRED EMBODIMENTS

Figure 1:
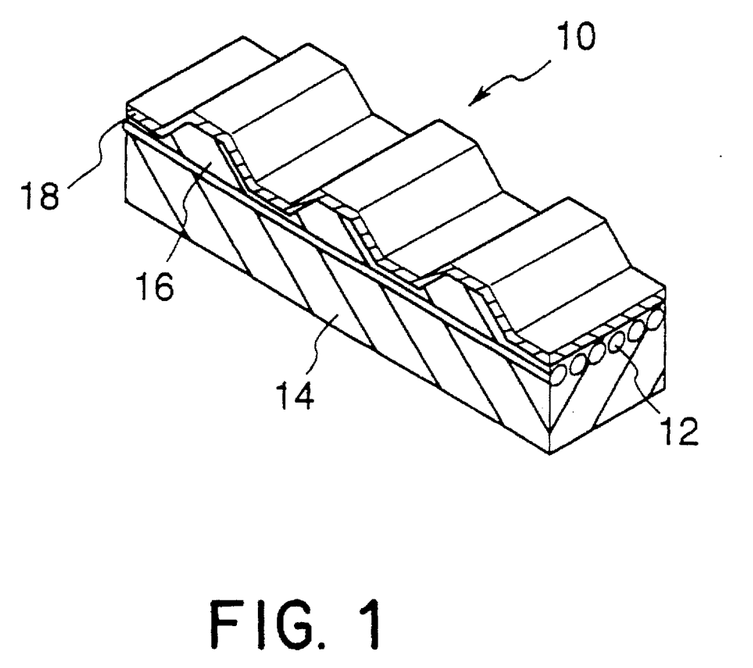
FIG. 1 is a perspective view of a toothed belt according to the present invention.

As shown in FIG. 1, the toothed belt 10 according to the present invention comprises a back rubber 14 embedding a tensile body (stem wire) 12, and tooth rubber 16, wherein a tooth sheet 18 is glued on an exposed tooth surface of the tooth rubber 16.

In producing the toothed belt of the present invention, the tooth sheet, impregnated with a rubber paste, is wound around a metal mold with a groove in the shape of a belt tooth, the tensile body treated with adhesive is wound around the tooth sheet, an unvulcanized rubber compound sheet, made up of the tooth rubber and the back rubber, is wound around the tensile body, then the resulting component is formed and vulcanized in a pressure tank, and thereafter the vulcanized component is taken thereout and cut out at equal intervals, thereby providing a ring belt.

As for the tensile body, a twisted stem wire made of, such as glass fiber, aramid fiber, or metal fiber is usually used. Such a tensile body is impregnated into an adhesive aqueous solution before using. As for the adhesives, generally, an aqueous solution is used (RFL), in which latex is mixed with an RF resin solution resulting from a chemical reaction between resorcinol and formalin.

Further, a tensile body, covered with an overcoating, such as a rubber paste, on the surface of the stem wire impregnated with the RFL, may be used.

As for the tooth sheet, a fabric is used which is made of a fiber, such as polyamide fiber, polyaramide fiber, or polyester fiber. Before the tooth sheet is adhered to the surface of the tooth rubber, the RFL treatment is performed, or a rubber paste, to which an organic compound with an isocyanato group is added, is impregnated into a rubber solution, in which hydrogenated nitrile rubber, similar to the rubber body, is dissolved with an organic solvent. Alternatively, the rubber paste treatment is performed after the RFL treatment. It is noted that in the latter case the organic compound with an isocyanato group is not necessarily added to the rubber paste.

Then, the tooth sheet is dried and treated with reaction at the temperature of about 150°–250° C. In addition, the rubber paste may be impregnated or coated therewith after the RFL treatment depending on the situation.

Furthermore, specific examples of the organic compound with an isocyanato group which may be used in the present invention include polyphenyl isocyanato, triphenylmethane triisocyanato, tolylene diisocyanate, 4,4'-diphenylmethane diisocyanato, xylene diisocyanato, meta-xylene diisocyanato, hexamethylene diisocyanato, lysine isocyanate, 4,4'-methylenebis(cyclohexyl isocyanato), methylcyclohexane 2,4(2,6)diisocyanato, 1,3-(isocyanatomethyl)cyclohexane, isophorone diisocyanato, trimethyl hexamethylene diisocyanato, dimer acid isocyanate, and so forth.

The rubber composition comprises a polymer composition in which zinc polymethacrylate and hydrogenated nitrile rubber with hydrogenation rate of 90–95% are compounded in the weight ratio of from 4:96 to 20:80; 0.38–0.91 g of organic peroxide, based on —O—O-linkage amount, to 100 g of polymer composition; 0.5–2.0 g of more than one variety of higher organic acid ester, 0.5–2.0 g of maleimide compound; and 20–40 g of calcium carbonate. It is preferable that less than 10 g of carbon is compounded therewithin.

It is preferable that the foregoing polymer composition be a composition, wherein polymer complex and hydrogenated nitrile rubber with hydrogenation rate of 90–95% are compounded in the weight ratio of from 10:90 to 40:60. The polymer complex is a polymerized complex wherein zinc polymethacrylate and hydrogenated nitrile rubber with hydrogenation rate of 90–95% are polymerized in the compounding weight ratio of from 40:60 to 50:50.

It is considered that zinc polymethacrylate makes the polymer complex a higher structure and forms a filler, minutely dispersed in the polymer complex, although the theoretical reasons thereof remain to be seen. In this regard, it is also considered that zinc polymethacrylate by itself has a greater tensile strength than when it is compounded with hydrogenated nitrile rubber with hydrogenation rate of 90–95% in the weight ratio of from 4:96 to 20:80. The reason why the hydrogenation rate of hydrogenated nitrile rubber should be kept within the range of 90–95% is that in the case where the hydrogenation rate thereof is less than 90%, thermal resistance thereof would decline while in the case where the hydrogenation rate thereof is more than 95%, the modulus thereof at a high temperature would decline, thereby softening and degrading a performance to reduce possible tooth breakage.

The reason why the compounding ratio of zinc polymethacrylate and hydrogenated nitrile rubber with hydrogenation rate of 90–95% should be kept within the weight ratio of from 4:96 to 20:80 is that in the case where the compounding ratio of zinc polymethacrylate is less than 4 in weight, fatigue of the tensile body would occur, thereby degrading the longevity of the belt while in the case where the compounding ratio thereof is more than 20 in weight, similarly, fatigue of the tensile body would occur, thereby degrading the longevity of the belt. Similarly, in the case where zinc polymethacrylate of the polymer complex and hydrogenated nitrile rubber with hydrogenation rate of 90–95% are polymerized in the compounding weight ratio of from 40:60 to 50:50, the fatigue of the tensile body would occur and the longevity of the belt would be degraded if the compounding weight ratio reaches outside the foregoing range.

Organic peroxide is added as a crosslinking agent. Specific examples of the organic peroxide which may be used for the crosslinking agent in the present invention include diacylperoxide series, peroxyester series, dialkyl peroxide series, or perketal series. However, in consideration of such factors as workability, safety, preservability, reactivity and the like, practically preferred examples of the organic peroxide which may be used for the crosslinking agent include di-t-butylperoxide, dicumyl peroxide, t-butylcumyl peroxide, 1,1-di-t-butylperoxy-3,3,5-trimethylcyclohexane, 2,5-di-methyl-2,5-di(t-butylperoxy)hexane, 2,5-di-methyl-2,5-di(t-butylperoxy)hexane-3, bis(t-butylperoxydiisopropyl)benzene, 2,5-di-methyl-2,5-di(benzoylperoxy)hexane, t-butylperoxy benzoate, and t-butylperoxy 2-ethyl-hexylcarbonate.

Of the above-mentioned organic peroxides, four species of dicumyl peroxide, t-butylcumyl peroxide, 2,5-di-methyl-2,5-di(t-butylperoxy)hexane, and bis(t-butylperoxydi-isopropyl)benzene are preferable. Further, in consideration of mass productivity, dicumyl peroxide and bis(t-butylperoxydi-isopropyl)benzene are especially preferable.

Furthermore, it would be concluded that the most appropriate organic peroxide in practical use is bis(t-butylperoxydi-isopropyl)benzene because the products of dicumyl peroxide give off an offensive smell. Bis(t-butylperoxydi-isopropyl)benzene has isomers of 1,3 bis(t-butylperoxydi-isopropyl)benzene and 1,4 bis(t-butylperoxydi-isopropyl)benzene, each of which may be used therefor.

Generally, organic peroxide agents are provided on the market, wherein each of the 1,3 or 1,4 bis(t-butylperoxydi-isopropyl)benzene per se or a mixture of both of the same is carried by a carrier, such as calcium carbonate or silica, and formed into a pellet or powder as it is. In any case, there is no difference between 1,3 and 1,4 bis(t-butylperoxydi-isopropyl)benzene in terms of the uses according to the present invention.

The amount of organic peroxide crosslinking agents used is 0.38–0.91 g, based on —O—O-linkage amount, to 100 g of polymer composition.

If the amount of organic peroxide crosslinking agents used is less than 0.38 g, performance to reduce possible tooth breakage would be degraded. On the other hand, if the amount thereof is more than 0.91 g, not only thermal resistance but also formability of the belt would be degraded, thereby causing a high incidence of inferior goods and making mass production difficult.

Higher organic acid ester compound is added as a co-crosslinking agent. Specific examples of the higher organic acid ester compound which may be used for the co-crosslinking agent in the present invention include ethylene dimethacrylate, 1,3 butylene dimethacrylate, 1,4 butylene dimethacrylate, polyethyleneglycol dimethacrylate, 1,4 butanediol diacrylate, 1,6 hexanediol diacrylate, 2,2' bis(4-methacryloxy diethoxyphenyl)propane, 2,2 bis(4-acryloxy diethoxyphenyl)propane, trimethylolpropane triacrylate, trimethylolpropane trimethacrylate, pentaerythritol acrylate, 3-chloro-2-hydroxypropyl methacrylate, oligoester acrylate, triallyl isocyanurate, triallyl cyanurate, triallyl trimellitate, diallyl phthalate, diallyl chlorendate and the like.

Of the above-mentioned higher organic acid ester compounds, preferred are ethylene dimethacrylate, trimethylolpropane triacrylate, trimethylolpropane trimethacrylate, triallyl isocyanurate, triallyl cyanurate, zinc methacrylate, zinc dimethacrylate, and zinc acrylate.

The amount of higher organic acid ester compound used is 0.5–2.0 g to the 100 g of polymer composition.

If the amount of higher organic acid ester compound used is less than 0.5 g, performance to reduce possible tooth breakage of the belt would be degraded. On the other hand, if the amount thereof is more than 2.0 g, not only thermal resistance but also formability of the belt would be degraded, thereby causing a high incidence of inferior goods and making mass production difficult.

Maleimide compound is added as a co-crosslinking agent. Specific examples of the maleimide compound which may be used for the co-crosslinking agent in the present invention include N,N'-m-phenylene bismaleimide, N,N'-1,10-decamethylene bismaleimide, and N,N'-4,7-dioxadecane-1,10-bismaleimide. It is preferable that each rate of increase in quantity to the amount of N,N'-m-phenylene bismaleimide is 10% for N,N'-1,10-decamethylene bismaleimide while 20% for N,N'-4,7-dioxadecane-1,10-bismaleimide.

The amount of phenylene dimaleimide used is 0.5–2.0 g to 100 g of polymer composition.

If the amount of phenylene dimaleimide used is 0.5 g, performance to reduce possible tooth breakage of the belt would be degraded. On the other hand, if the amount thereof is more than 2.0 g, not only thermal resistance but also formability of the belt would be degraded, thereby causing a high incidence of inferior goods and making mass production difficult.

Because performance to reduce possible tooth breakage of the belt is degraded if either one of the higher organic acid ester compound or the maleimide compound is individually used for a co-crosslinking agent, it is desirable to use these co-crosslinking agents together.

Calcium carbonate is added as a reinforcing agent. Usually, carbon is used therefor. However, if an excessive amount of carbon is added to hydrogenated nitrile rubber containing zinc polymethacrylate, the tensile strength thereof is lowered and the permanent strain thereof grows, whereby the heat radiation thereof cannot be ignored. Therefore, it is advisable that the content of carbon be limited. On the other hand, carbon contributes to the improvement of anti-wear properties. Taking the things as stated above into consideration, it is advisable that the content of carbon be no more than 10 g to 100 g of the polymer composition. If the content of carbon is about 10 g, the decline of tensile strength of the toothed belt can be ignored. Preferably 10 g of N550 class is added thereto.

Calcium carbonate is added thereto in an amount of 20–40 g in order to supplement anti-wear properties. If the addition of calcium carbonate is less than 20 g, performance to reduce possible tooth breakage would decline, while if it is more than 40 g, not only formability in producing the belt but also thermal resistance thereof would be degraded.

Preferred embodiments of the present invention will now be described in detail with reference to the accompanying tables.

TABLE 1

TABLE 1 shows a compound example of the rubber composition for the toothed belt according to the present invention.

| COMPOUNDING AGENT | | EXAMPLE | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Polymer | Hydrogenated Nitrile Rubber ZSC 2295 Note 1) | 30 | 20 | 10 | 40 | 30 | 30 | 30 | 30 | 30 | 30 | 30 | 30 | 30 | 30 |
| | ZETPOL Note 2) | 70 | 80 | 90 | 60 | | | 70 | 70 | 70 | 70 | 70 | 70 | 70 | 70 |
| | ZETPOL Note 3) | | | | | 70 | | | | | | | | | |
| | ZETPOL Note 4) | | | | | | 70 | | | | | | | | |
| | ZETPOL Note 5) | | | | | | | | | | | | | | |
| | ZETPOL Note 6) | | | | | | | | | | | | | | |
| | Chloroprene Rubber | | | | | | | | | | | | | | |
| | Chlorosulfuric Polyethylene | | | | | | | | | | | | | | |
| Carbon Black N550 (FEF) | | 10 | 10 | 10 | 10 | 10 | 10 | 10 | 10 | 10 | 10 | 10 | 10 | 10 | 10 |
| Carbon Black N770 (SRF) | | | | | | | | | | | | | | | |
| Calcium Carbonate Note 7) | | 30 | 30 | 30 | 30 | 30 | 30 | 30 | 30 | 30 | 30 | 20 | 40 | 30 | 30 |
| α,α'bis(t-butylperoxy di-isopropyl)benzene Note 8) | | 7 | 7 | 7 | 7 | 7 | 7 | 7 | 7 | 7 | 7 | 7 | 7 | 5 | 12 |
| Co-Crosslinking Agent | | | | | | | | | | | | | | | |
| Ethylene dimethacrylate (EG) | | 1 | 1 | 1 | 1 | 1 | 1 | | | 0.5 | 2 | 1 | 1 | 1 | 1 |
| Trimethylolpropane triacrylate (TMP) | | | | | | | | 1 | | | | | | | |
| Triallyl isocyanurate (TAIC) | | | | | | | | | 1 | | | | | | |
| N,N'-m phenlene bismaleimide | | 1 | 1 | 1 | 1 | 1 | 1 | 1 | 1 | 0.5 | 2 | 1 | 1 | 1 | 1 |
| 1,2-polybutadiene (—OH) | | | | | | | | | | | | | | | |
| Antioxidant | | 3 | 3 | 3 | 3 | 3 | 3 | 3 | 3 | 3 | 3 | 3 | 3 | 3 | 3 |
| Plasticizer | | 4 | 4 | 4 | 4 | 4 | 4 | 4 | 4 | 4 | 4 | 4 | 4 | 4 | 4 |
| Wax | | 1.5 | 1.5 | 1.5 | 1.5 | 1.5 | 1.5 | 1.5 | 1.5 | 1.5 | 1.5 | 1.5 | 1.5 | 1.5 | 1.5 |
| Zinc White | | | | | | | | | | | | | | | |
| Stearic Acid | | | | | | | | | | | | | | | |
| Magnesium Oxide | | | | | | | | | | | | | | | |
| Sulphur | | | | | | | | | | | | | | | |
| Vulcanization Accelerator | | | | | | | | | | | | | | | |
| Calcium Hydroxide | | | | | | | | | | | | | | | |
| Hydrotalcite | | | | | | | | | | | | | | | |

Organic Peroxide; -0-0-Linkage Converted Amount
3 phr = 0.23 g, 5 phr = 0.38 g, 7 phr = 0.53 g
12 phr = 0.91 g, 15 phr = 1.14 g
(Round the number to three decimal places in Conversion)
Note 1) Hydrogenated NBR containing Zinc Polymethacrylate, manufactured by Nippon Zeon Co., Ltd.
Note 2)–6) Hydrogenated NBR, manufactured by Nippon Zeon Co., Ltd. (Hydrogeneration Rate: 2: 90%, 3: 93%, 4: 95%, 5: 100%, 6:80%)
Note 7) HAKUENKA CC manufactured by Shiraishi Kogyo Kaisha, Ltd.
Note 8) EXAMPLE 1: PEROXIMON F40, manufactured by NOF Corp. EXAMPLE 2: PERKADOX 14/40, manufactured by KAYAKU AKZO Corp.

EXAMPLES 1–14 show one embodiment of the rubber composition, wherein α,α' bis(t-buthylperoxydi-isopropyl) benzene agent (PEROXIMON F40 manufactured by NOF Corp., or PERKADOX 14/40 manufactured by KAYAKU AKZO Corp.) is used for the organic peroxide, higher organic acid ester, such as N,N'-m-phenylene dimaleimide and ethylene dimethacrylate, trimethylolpropane trimethacrylate or diallyl chlorendate, is used for a co-crosslinking agent, carbon black, and calcium carbonate are added to the polymer complex, in which 55 weight portion of zinc polymethacrylate and 45 weight portion of hydrogenated nitrile rubber with hydrogenation rate of 90% are polymerized (hereinafter referred to as "ZSC2295"), and hydrogenated nitrile rubber with hydrogenation rate of 90–95% (ZETPOL manufactured by Nippon Zeon Co., Ltd.).

Because bis(t-buthylperoxydi-isopropyl) benzene agent contains 60% of an additive, each one of calcium carbonate or silica by itself or mixture of the both of the same, the net weight of the compound is 2.8 g when the content by amount of benzene agent is 7 g. Further, as for —O—O-linkage amount, since the compound includes two —O—O-groups therewithin, the formula thereof is as follows:

2.8 g×16×2×2 (molecular weight of the two —O—O-groups)÷338 (molecular weight of the compound)=0.53 g Similarly, the net weight of thereof is 0.23 g in case where the addition of benzene agent is 3 g; 0.38 g when the addition is 5 g; 0.53 g when the addition is 7 g; 0.91 g when the addition is 12 g; and 1.14 g when the addition is 21 g.

TABLE 2

TABLE 2 shows COMPARATIVE EXAMPLES 1–15 of the rubber composition with respect to compound amounts of polymer composition, carbon black, and calcium carbonate; whether co-crosslinking agent is contained or note, especially whether maleimide compound is contained or note; compound amounts of co-crosslinking agent, and organic peroxide.

| COMPOUNDING AGENT | | COMPARATIVE EXAMPLE | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Polymer | Hydrogenated Nitrile Rubber | 100 | 50 | 30 | 30 | 30 | 30 | 30 | 30 | 30 | 30 | 30 | 30 | 30 | 30 | 30 |
| | ZSC 2295 Note 1) | | 50 | | | 70 | 70 | 70 | 70 | 70 | 70 | 70 | 70 | 70 | 70 | 70 |
| | ZETPOL Note 2) | | | | | | | | | | | | | | | |
| | ZETPOL Note 3) | | | | | | | | | | | | | | | |
| | ZETPOL Note 4) | | | | | | | | | | | | | | | |
| | ZETPOL Note 5) | | | 70 | | | | | | | | | | | | |
| | ZETPOL Note 6) | | | | 70 | | | | | | | | | | | |
| | Chloroprene Rubber | | | | | | | | | | | | | | | |
| | Chlorosulfuric Polyethylene | | | | | | | | | | | | | | | |
| Carbon Black N550 (FEF) | | 10 | 10 | 10 | 10 | 45 | | 10 | 10 | 10 | 10 | 10 | 10 | 10 | 10 | 10 |
| Carbon Black N770 (SRF) | | | | | | | 60 | | | | | | | | | |
| Calcium Carbonate Note 7) | | | 30 | 30 | 30 | | | 30 | 30 | 30 | 30 | 30 | 30 | 30 | 30 | 30 |
| α,α'bis(t-butylperoxy di-isopropyl)benzene Note 8) | | 7 | 7 | 7 | 7 | 7 | 7 | 7 | 7 | 7 | 7 | 7 | 7 | 7 | 3 | 15 |
| Co-Crosslinking Agent | | | | | | | | | | | | | | | | |
| Ethylene dimethacrylate (EG) | | 1 | 1 | 1 | 1 | 1 | 1 | — | 2 | 0.1 | 3 | | 1 | 1 | 1 | 1 |
| Trimethylolpropane triacrylate (TMP) | | | | | | | | — | | | | | | | | |
| Triallyl isocyanurate (TAIC) | | | | | | | | — | | | | | | | | |
| N,N'-m phenlene bismaleimide | | 1 | 1 | 1 | 1 | 1 | 1 | — | | 0.1 | 3 | 1 | 1 | 1 | 1 | 1 |
| 1,2-polybutadiene (—OH) | | | | | | | | — | | | | 1 | | | | |
| Antioxidant | | 3 | 3 | 3 | 3 | 3 | 3 | 3 | 3 | 3 | 3 | 3 | 3 | 3 | 3 | |
| Plasticizer | | 4 | 4 | 4 | 4 | 4 | 4 | 4 | 4 | 4 | 4 | 4 | 4 | 4 | 4 | |
| Wax | | 1.5 | 1.5 | 1.5 | 1.5 | 1.5 | 1.5 | 1.5 | 1.5 | 1.5 | 1.5 | 1.5 | 1.5 | 1.5 | 1.5 | |
| Zinc White | | | | | | | | | | | | | | | | |
| Stearic Acid | | | | | | | | | | | | | | | | |
| Magnesium Oxide | | | | | | | | | | | | | | | | |
| Sulphur | | | | | | | | | | | | | | | | |
| Vulcanization Accelerator | | | | | | | | | | | | | | | | |
| Calcium Hydroxide | | | | | | | | | | | | | | | | |
| Hydrotalcite | | | | | | | | | | | | | | | | |

Organic Peroxide; -0-0-Linkage Converted Amount
3 phr = 0.23 g, 5 phr = 0.38 g, 7 phr = 0.53 g
12 phr = 0.91 g, 15 phr = 1.14 g
(Round the number to three decimal places in Conversion)
Note 1) Hydrogenated NBR containing Zinc Polymethacrylate, manufactured by Nippon Zeon Co., Ltd.
Note 2)–6) Hydrogenated NBR, manufactured by Nippon Zeon Co., Ltd. (Hydrogeneration Rate: 2: 90%, 3: 93%, 4: 95%, 5: 100%, 6: 80%)
Note 7) HAKUENKA CC manufactured by Shiraishi Kogyo Kaisha, Ltd.
Note 8) EXAMPLE 1: PEROXIMON F40, manufactured by NOF Corp. EXAMPLE 2: PERKADOX 14/40, manufactured by KAYAKU AKZO Corp.

TABLE 3

TABLE 3 shows various examples 1–7 of the conventional rubber composition.

| COMPOUNDING AGENT | | CONVENTIONAL EXAMPLE | | | | | | |
|---|---|---|---|---|---|---|---|---|
| | | 1 | 2 | 3 | 4 | 5 | 6 | 7 |
| Polymer | Hydrogenated Nitrile Rubber | | | | | | | |
| | ZSC 2295 Note 1) | 100 | 100 | 100 | 100 | 100 | | |
| | ZETPOL Note 2) | | | | | | | |
| | ZETPOL Note 3) | | | | | | | |
| | ZETPOL Note 4) | | | | | | | |
| | ZETPOL Note 5) | | | | | | | |
| | ZETPOL Note 6) | | | | | | | |
| | Chloroprene Rubber | | | | | | 100 | |
| | Chlorosulfuric Polyethylene | | | | | | | 100 |
| Carbon Black N550 (FEF) | | 50 | 50 | 50 | 50 | 60 | 50 | 35 |
| Carbon Black N770 (SRF) | | | | | | | | |
| Calcium Carbonate Note 7) | | | | | | | | |
| α,α'bis(t-butylperoxy di-isopropyl)benzene Note 8) | | 5 | 5 | | | | | |
| Co-Crosslinking Agent | | | | | | | | |
| Ethylene dimethacrylate (EG) | | | 1 | | | | | |
| Trimethylolpropane triacylate (TMP) | | 1 | | | | | | |
| Triallyl isocyanurate (TAIC) | | | | | | | | |
| N,N'-m phenlene bismaleimide | | 1 | 1 | | | | | |
| 1,2-polybutadiene (—OH) | | | | | | | | |
| Antioxidant | | 3 | 3 | 5 | 5 | 5 | 5 | 5 |
| Plasticizer | | 10 | 10 | 10 | 10 | 10 | 10 | 10 |
| Wax | | 0.5 | 0.5 | 0.5 | 0.5 | 0.5 | 0.5 | 2 |
| Zinc White | | 10 | 10 | 5 | 5 | 5 | 5 | 5 |
| Stearic Acid | | 1 | 1 | 1 | 1 | 1 | 1 | |
| Magnesium Oxide | | | | | | | 4 | |
| Sulphur | | | | 1 | 2 | 1 | 0.5 | |
| Vulcanization Accelerator | | | | 2 | 3 | 2 | 1 | |
| Calcium Hydroxide | | | | | | | | 10 |
| Hydrotalcite | | | | | | | | 20 |

Organic Peroxide; -0-0-Linkage Converted Amount
3 phr = 0.23 g, 5 phr = 0.38 g, 7 phr = 0.53 g
12 phr = 0.91 g, 15 phr = 1.14 g
(Round the number to three decimal places in Conversion)
Note 1) Hydrogenated NBR containing Zinc Polymethacrylate, manufactured by Nippon Zeon Co., Ltd.
Note 2)–6) Hydrogenated NBR, manufactured by Nippon Zeon Co., Ltd. (Hydrogenation Rate: 2: 90%, 3: 93%, 4: 95%, 5: 100%, 6: 80%)
Note 7) HAKUENKA CC manufactured by Shiraishi Kogyo Kaisha, Ltd.
Note 8) EXAMPLE 1: PEROXIMON F40, manufactured by NOF Corp. EXAMPLE 2: PERKADOX 14/40, manufactured by KAYAKU AKZO Corp.

TABLE 4

TABLE 4 shows performances of a simple substance of the rubber and that of the belt as shown in TABLE 1 of the present invention.

| EVALUATION ITEM | | UNIT | EXAMPLE | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| A | Normal Condition | | | | | | | | | | | | | | | |
| Performance of rubber as a simple substance | Rubber Hardness (Hs) | JIS-A | 79 | 77 | 75 | 81 | 78 | 76 | 79 | 79 | 78 | 81 | 76 | 82 | 77 | 82 |
| | Tensile Strength (TB) | kg/cm² | 300 | 260 | 250 | 360 | 321 | 330 | 307 | 298 | 301 | 298 | 303 | 290 | 310 | 326 |
| | Elongation (EB) | % | 450 | 400 | 380 | 451 | 504 | 543 | 465 | 419 | 481 | 376 | 462 | 411 | 496 | 393 |
| | 100% Modulus | kg/cm² | 45 | 41 | 38 | 51 | 42 | 40 | 43 | 44 | 40 | 50 | 42 | 49 | 41 | 49 |
| | Tear Resistance (TR) | kg/cm² | 65 | 63 | 61 | 68 | 66 | 68 | 66 | 61 | 69 | 61 | 63 | 59 | 67 | 66 |
| | Thermal Resistance (Aging after 140° C. × 288 hrs.) | | | | | | | | | | | | | | | |
| | Rubber Hardness (Hs) | JIS-A | 86 | 83 | 82 | 87 | 83 | 80 | 86 | 86 | 84 | 86 | 86 | 88 | 82 | 87 |

TABLE 4-continued

TABLE 4 shows performances of a simple substance of the rubber and that of the belt as shown in TABLE 1 of the present invention.

| EVALUATION ITEM | | UNIT | EXAMPLE | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| B Performance of Belt | Tensile Strength | kg/cm² | 240 | 221 | 219 | 294 | 281 | 284 | 243 | 241 | 232 | 240 | 242 | 235 | 239 | 261 |
| | Elongation (EB) | % | 320 | 316 | 304 | 319 | 454 | 503 | 321 | 302 | 386 | 296 | 337 | 311 | 418 | 287 |
| | 100% Modulus | kg/cm² | 83 | 78 | 77 | 95 | 71 | 69 | 83 | 83 | 74 | 90 | 81 | 85 | 70 | 94 |
| | Tear Resistance (TR) | kg/cm² | 68 | 67 | 65 | 72 | 76 | 74 | 69 | 65 | 73 | 66 | 68 | 62 | 71 | 70 |
| | A Test (Thermal Resistance) 140° C. Longevity of Belt | Hrs. | 1115 | 1190 | 1221 | *1084 | 1319 | 1424 | 1116 | 1107 | 1137 | 1102 | 1162 | 1083 | 1288 | 1081 |
| | B Test (Performance to Reduce Possible Tooth Breakage) Longevity of Belt | | | | | | | | | | | | | | | |
| | Normal Temperature | Hrs. | 438 | 410 | 392 | 456 | 414 | 402 | 442 | 422 | 393 | 391 | 435 | 426 | 397 | 426 |
| | 100° C. | Hrs. | 366 | 361 | 358 | 371 | 323 | 311 | 359 | 361 | 340 | 303 | 368 | 359 | 318 | 370 |

*Belt Torn

TABLE 5

Table 5 shows performances of a simple substance of the rubber and that of the belt corresponding the COMPARATIVE EXAMPLES as shown in TABLE 2.

| EVALUATION ITEM | | UNIT | COMPARATIVE EXAMPLE | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| A Performance of rubber as a simple substance | Normal Condition | | | | | | | | | | | | | | | | |
| | Rubber Hardness (Hs) | JIS-A | 91 | 83 | 76 | 79 | 78 | 78 | 72 | 72 | 73 | 84 | 75 | 71 | 84 | 77 | 84 |
| | Tensile Strength (TB) | kg/cm² | 440 | 370 | 300 | 291 | 291 | 288 | 381 | 380 | 383 | 311 | 302 | 331 | 291 | 293 | 313 |
| | Elongation (EB) | % | 215 | 490 | 503 | 409 | 415 | 418 | 508 | 491 | 502 | 408 | 477 | 502 | 404 | 611 | 288 |
| | 100% Modulus | kg/cm² | 191 | 61 | 35 | 48 | 48 | 49 | 33 | 36 | 34 | 66 | 38 | 36 | 54 | 28 | 61 |
| | Tear Resistance (TR) | kg/cm² | 81 | 72 | 69 | 61 | 57 | 56 | 73 | 70 | 71 | 48 | 53 | 66 | 61 | 72 | 49 |
| | Thermal Resistance (Aging after 140° C. × 288 hrs.) | | | | | | | | | | | | | | | | |
| | Rubber Hardness (Hs) | JIS-A | 92 | 86 | 78 | 89 | 84 | 84 | 81 | 80 | 82 | 92 | 86 | 79 | 92 | 83 | 93 |
| | Tensile Strength | kg/cm² | 431 | 367 | 310 | 215 | 258 | 263 | 222 | 241 | 227 | 215 | 246 | 242 | 207 | 233 | 188 |
| | Elongation (EB) | % | 162 | 354 | 481 | 211 | 238 | 255 | 206 | 214 | 209 | 266 | 238 | 410 | 251 | 476 | 206 |
| | 100% Modulus | kg/cm² | 284 | 77 | 51 | 106 | 88 | 89 | 79 | 79 | 81 | 111 | 103 | 80 | 103 | 52 | 122 |
| | Tear Resistance (TR) | kg/cm² | 83 | 69 | 68 | 53 | 61 | 63 | 53 | 62 | 66 | 51 | 57 | 71 | 59 | 88 | 53 |
| B Performance of Belt | A Test (Thermal Resistance) 140° C. Longevity of Belt | Hrs. | *340 | *671 | — | 891 | 864 | 872 | — | — | — | 778 | — | — | 823 | — | 818 |
| | B Test (Performance to Reduce Possible Tooth Breakage) Longevity of Belt | | | | | | | | | | | | | | | | |
| | Normal Temperature | Hrs. | — | — | 214 | 445 | 292 | — | — | — | 254 | — | 301 | 309 | — | 223 | — |
| | 100° C. | Hrs. | — | — | 96 | 352 | 183 | 191 | 107 | 111 | 123 | — | 196 | 228 | — | 131 | — |

*Belt Torn

TABLE 6

Table 6 shows performances of a simple substance of the rubber and that of the belt corresponding to CONVENTIONAL EXAMPLES as shown in TABLE 3.

|  | EVALUATION ITEM | UNIT | COMPARATIVE EXAMPLE | | | | | | |
|---|---|---|---|---|---|---|---|---|---|
|  |  |  | 1 | 2 | 3 | 4 | 5 | 6 | 7 |
| A Performance of rubber as a simple substance | Normal Condition | | | | | | | | |
|  | Rubber Hardness (Hs) | JIS-A | 73 | 73 | 69 | 71 | 77 | 72 | 67 |
|  | Tensile Strength (TB) | kg/cm$^2$ | 230 | 221 | 208 | 200 | 215 | 210 | 260 |
|  | Elongation (EB) | % | 300 | 335 | 530 | 520 | 407 | 440 | 400 |
|  | 100% Modulus | kg/cm$^2$ | 50 | 49 | 26 | 38 | 45 | 36 | 28 |
|  | Tear Resistance (TR) | kg/cm$^2$ | 55 | 56 | 60 | 62 | 59 | 63 | 53 |
|  | Thermal Resistance (Aging after 140° C. × 288 hrs.) | | | | | | | | |
|  | Rubber Hardness (Hs) | JIS-A | 80 | 80 | 84 | 85 | 89 | 97 | 83 |
|  | Tensile Strength | kg/cm$^2$ | 245 | 237 | 178 | 195 | 202 | 120 | 160 |
|  | Elongation (EB) | % | 220 | 221 | 155 | 150 | 121 | 30 | 200 |
|  | 100% Modulus | kg/cm$^2$ | 93 | 91 | 110 | 124 | 138 | — | 69 |
|  | Tear Resistance (TR) | kg/cm$^2$ | 71 | 71 | 36 | 38 | 43 | 11 | 41 |
| B Performance of Belt | A Test (Thermal Resistance) 140° C. | | | | | | | | |
|  | Longevity of Belt | Hrs. | 878 | 881 | 511 | 550 | 492 | 146 | 529 |
|  | B Test (Performance to Reduce Possible Tooth Breakage) Longevity of Belt | | | | | | | | |
|  | Normal Temperature | Hrs. | 303 | 298 | 71 | 107 | 143 | 45 | 65 |
|  | 100° C. | Hrs. | 221 | 216 | 46 | 84 | 111 | 27 | 40 |

Performance of a belt is measured with respect to thermal resistance and performance to reduce possible tooth breakage. The method of measurement is as follows:

Performance of thermal resistance is valued by a thermal resistant running test (hereinafter referred to as "A test"), wherein a tested belt is made to run, with a constant tension of 15 kgf, 400 revolutions per minutes, and no load, at an ambient temperature around the running belt of 140° C. by constantly supplying fresh hot wind, by means of a tesing machine comprising a driving pulley with nineteen teeth (8 mm pitch), a driven pulley with nineteen teeth, and an idler with a diameter of 45 mm, and the time, until which cracks come out at a back of the tested belt or a root portion of the tooth, is measured.

Performance to reduce possible tooth breakage is valued by a performance to reduce possible tooth breakage test (hereinafter referred to as "B test"), wherein a tooth of a tested belt with a width of 19.05 mm is made to load, with 25 kgf of repeated shearing force at an interval of 500 times per minutes, in a direction orthogonally from the width direction of the belt, under an atmosphere at a normal temperature or 100° C., and the time, until which the tooth of the belt is broken, is measured.

As will be apparent from the COMPARATIVE EXAMPLES 1 and 2, in case where ZSC2295 is contained in the rubber composition entire portion or 50 weight percent, i.e. zinc polymethacrylate is more than 20 weight portion in 100 weight portion of polymer composition, the rubber composition excels in terms of performances as a simple substance of the rubber, however, it falls far behind with respect to performance of toothed belt. The toothed belts, using the rubber composition according to the comparative examples 1 and 2, were torn up 340 and 671 hours, respectively, after the A test began. It is considered that the rubber composition having the tensile body causes fatigue, although the theoretical reasons thereof remain to be seen.

As will be apparent from the conventional rubber composition according to TABLE 3, in case where ZSC2295 is not contained in the rubber composition at all, i.e. hydrogenated nitrile rubber, containing no zinc polymethacrylate, is used therefor, the toothed belt is not worthy of use. Similarly, the rubber composition which does not contain zinc polymethacrylate at all is thought to have the tensile body cause fatigue.

On the other hand, as shown in EXAMPLES 1 to 4 according to the present invention, in case of using the rubber composition in which the compounding weight ratio of zinc polymethacrylate to hydrogenated nitrile rubber is 4:96 to 20:80, the longevity of the belt is remarkably superior both in A test and B test to that of the COMPARATIVE EXAMPLE and CONVENTIONAL EXAMPLE.

It is noted that a preferable example in terms not only of thermal resistance but also of performance to reduce possible tooth breakage is EXAMPLE 1. In this case, the compounding weight ratio of zinc polymethacrylate to hydrogenated nitrile rubber is 13.5:86.5.

Next, in case of using a rubber composition compounding hydrogenated nitrile rubber in addition to ZSC2295, it is desirable that hydrogenated nitrile rubber with hydrogenation rate of 90–95% be used. EXAMPLE 1 shows a rubber composition wherein hydrogenated nitrile rubber with hydrogenation rate of 90% is used. EXAMPLE 5 shows a rubber composition wherein hydrogenated nitrile rubber with hydrogenation rate of 93% is used. EXAMPLE 6 shows a rubber composition wherein hydrogenated nitrile rubber with hydrogenation rate of 95% is used. On the contrary, EXAMPLE 3 shows a rubber composition wherein hydrogenated nitrile rubber with hydrogenation rate of 100% is used. EXAMPLE 4 shows a rubber composition wherein hydrogenated nitrile rubber with hydrogenation rate of 80% is used.

As will be apparent from COMPARATIVE EXAMPLE 3, performance to reduce possible tooth breakage did not improve in case of using a rubber composition wherein hydrogenated nitrile rubber with hydrogenation rate of 100% is used. While, as shown in COMPARATIVE EXAMPLE 4, thermal resistance did not improve in case of using the same hydrogenation rate of 80%.

According to COMPARATIVE EXAMPLES 5 and 6, a rubber composition, exclusively containing carbon and no calcium carbonate, has a longevity as long as that shown in CONVENTIONAL EXAMPLES 1 to 7. On the contrary, as will be apparent from EXAMPLES 1 to 12, the longevity of the toothed belt can be improved by containing calcium carbonate therein.

Further, according to EXAMPLES 11 and 12, and COMPARATIVE EXAMPLES 12 and 13, the longevity of the toothed belt can be improved by containing calcium carbonate ranging from 20 to 40 g. As shown in COMPARATIVE EXAMPLE 12, performance to reduce possible tooth breakage did not improve in case of containing 10 g of calcium carbonate. As shown in COMPARATIVE EXAMPLE 13, thermal resistance was inferior in case of containing 50 g of calcium carbonate.

As shown in COMPARATIVE EXAMPLE 7, because a rubber composition, comprising no co-crosslinking agent, has problems both in thermal resistance and in performance to reduce possible tooth breakage, the toothed belt therefrom is not worthy of use. Further, as shown in COMPARATIVE EXAMPLE 8, because a rubber composition, containing no maleimide compound, has a problem in performance to reduce possible tooth breakage at a high temperature, the toothed belt therefrom is not worthy of use as well. As shown in COMPARATIVE EXAMPLE 11, because a rubber composition, containing no higher organic acid ester compound, has a problem in thermal resistance, the toothed belt therefrom is not worthy of use.

Furthermore, as shown in COMPARATIVE EXAMPLE 9, if each of higher organic acid ester compound and maleimide compound is 0.1 g, the rubber composition has a problem in performance to reduce possible tooth breakage. As shown in COMPARATIVE EXAMPLE 10, if each of higher organic acid ester compound and maleimide compound is 3 g, the rubber composition has a problem in thermal resistance.

On the other hand, as shown in EXAMPLES 7 to 10, if each of higher organic acid ester compound and maleimide compound is ranging from 0.5 to 2 g, respectively, preferable performance to reduce possible tooth breakage and good thermal resistance can be obtained.

As shown in EXAMPLES 1, 14 and 15, the rubber composition, containing 0.38–0.91 g of organic peroxide based on —O—O-linkage amount, can provide preferable performance to reduce possible tooth breakage and good thermal resistance. Among others, as shown in EXAMPLE 1, the rubber composition containing 0.53 g of organic peroxide, based on —O—O-linkage amount, is most preferable.

On the contrary, as shown in COMPARATIVE EXAMPLE 14, if the amount of organic peroxide used, based on —O—O-linkage amount, is 0.23 g, the rubber composition has a problem in performance to reduce possible tooth breakage. As shown in COMPARATIVE EXAMPLE 15, if the amount of organic peroxide used, based on —O—O-linkage amount, is 1.14 g, the rubber composition has a problem in thermal resistance. In addition, in the latter case, formability in producing the belt would be degraded, which in turn would decrease productivity thereof.

As will be seen from the foregoing description, according to the toothed belt of the present invention, because a rubber composition-molded cured material is formed and cured from a rubber composition which includes 0.38–0.91 g, based on —O—O-linkage amount, to the 100 g of polymer composition in which zinc polymethacrylate and hydrogenated nitrile rubber with hydrogenation rate of 90–95% are compounded in the weight ratio of from 4:96 to 20:80, of organic peroxide, 0.5–2.0 g of more than one variety of higher organic acid ester, 0.5–2.0 g of maleimide compound, and 20–40 g of calcium carbonate, performance to reduce possible tooth breakage and thermal resistance can be greatly improved and the longevity of the belt can be prolonged.

Further, because the toothed belt according to the present invention is excellent especially in performance to reduce possible tooth breakage, it can be adapted for a toothed belt for driving a cam shaft which can support the same load as the conventional toothed belt did even if the width thereof is made narrower than the conventional one.

Furthermore, because the toothed belt according to the present invention is excellent in thermal resistance and performance to reduce possible tooth breakage at a high temperature or under the high load, it can be adapted especially for a toothed belt for driving a cam shaft of an automobile engine.

The present invention also provides a polymer composition, wherein a polymer complex, in which zinc polymethacrylate and hydrogenated nitrile rubber with hydrogenation rate of 90–95% are polymerized in the compounding weight ratio of from 40:60 to 50:50, and hydrogenated nitrile rubber with hydrogenation rate of 90–95% are compounded in the weight ratio of from 10:90 to 40:60. Constructed as described above, the present invention can provide the toothed belt with more tensile strength than that provided by a polymer composition wherein zinc polymethacrylate and hydrogenated nitrile rubber with hydrogenation rate of 90–95% are compounded, at the beginning, in the weight ratio of from 4:96 to 20:80.

Furthermore, the present invention can not only improve abrasion resistance of the toothed belt because a rubber composition contains less than 10 g of carbon as a filler, but also avoid the decline of tensile strength thereof because the weight thereof is less than 10 g.

While the instant invention has been shown and described with specific reference to embodiments presently contemplated as the best mode of carrying out the invention in actual practice, it is to be understood that various changes may be made in adapting the invention to different embodiments without departing from the broader inventive concepts disclosed herein and comprehended by the claims which follow.

What is claimed is:

1. A toothed belt including a rubber composition-molded cured material, a tensile body embedded therewithin, and a tooth sheet, wherein said rubber composition-molded cured material comprises:

0.38 to 0.91 g of organic peroxide, based on —O—O— linkage amount, to 100 g of a polymer composition in which zinc polymethacrylate and hydrogenated nitrile rubber with hydrogenation rate of 90 to 95% are compounded in a weight ratio of from 4:96 to 20:80;

0.5 to 2.0 g to 100 g of polymer composition of more than one higher organic acid ester;

0.5 to 2.0 g to 100 g of polymer composition of maleimide compound; and 20 to 40 g to 100 g of polymer composition of calcium carbonate, wherein said polymer composition includes;

(i) polymer complex wherein zinc polymethacrylate and hydrogenated nitrile rubber with hydrogenation rate of 90–95% are polymerized in a compounding weight ratio of from 40:60 to 50:50; and (ii) hydrogenated nitrile rubber with hydrogenation rate of 90–95%, wherein said polymer complex and said hydrogenated nitrile rubber are compounded in a weight ratio of from 10:90 to 40:60.

2. A toothed belt as recited in claim 1, wherein said rubber composition comprises no more than 10 g of carbon as a filler.

* * * * *